(12) United States Patent
Best

(10) Patent No.: US 8,550,516 B2
(45) Date of Patent: Oct. 8, 2013

(54) ILLUMINATED SHOVEL TOOL

(76) Inventor: Jason Best, Riverside, CA (US)

( * ) Notice: Subject to any disclaimer, the term of this patent is extended or adjusted under 35 U.S.C. 154(b) by 0 days.

(21) Appl. No.: 13/440,017

(22) Filed: Apr. 5, 2012

(65) Prior Publication Data

US 2012/0256432 A1 Oct. 11, 2012

Related U.S. Application Data

(60) Provisional application No. 61/471,756, filed on Apr. 5, 2011.

(51) Int. Cl.
*A01B 1/00* (2006.01)
*A01D 9/00* (2006.01)
*A01D 11/00* (2006.01)

(52) U.S. Cl.
USPC ............... 294/59; 294/49; 362/119; 362/120

(58) Field of Classification Search
USPC .............. 294/49, 51, 54.5, 59; 362/102, 109, 362/119, 120, 253; 135/66, 910; 42/132
See application file for complete search history.

(56) References Cited

U.S. PATENT DOCUMENTS

| | | | |
|---|---|---|---|
| 3,976,564 A | 8/1976 | Holder | |
| 4,050,728 A * | 9/1977 | Davidson | 294/58 |
| 5,540,469 A * | 7/1996 | Albert | 294/1.4 |
| 5,845,986 A * | 12/1998 | Breen | 362/119 |
| D412,760 S * | 8/1999 | McCalla et al. | D26/38 |
| 6,283,610 B1 * | 9/2001 | Alajajian | 362/199 |
| 6,364,500 B1 * | 4/2002 | McCalla et al. | 362/120 |
| 6,419,371 B1 * | 7/2002 | McCalla et al. | 362/119 |
| 6,463,947 B1 * | 10/2002 | Wipperfurth | 135/65 |
| 6,851,823 B2 * | 2/2005 | Bilotti | 362/102 |
| 7,360,914 B2 * | 4/2008 | Kim | 362/119 |
| 7,484,859 B1 * | 2/2009 | Burke | 362/120 |
| 2003/0094823 A1 | 5/2003 | Bradford | |
| 2006/0221598 A1 | 10/2006 | March | |
| 2008/0016698 A1 | 1/2008 | Simpson | |
| 2008/0030033 A1 | 2/2008 | Taylor | |
| 2010/0164239 A1 | 7/2010 | Grennan | |

* cited by examiner

*Primary Examiner* — Stephen Vu
(74) *Attorney, Agent, or Firm* — Daniel Boudwin

(57) ABSTRACT

Disclosed is a shovel tool implement having an imbedded illumination means and a means for storing an auxiliary light source in its handle. The tool comprises an elongated shaft having a proximal handle end and distal working end, the distal end preferably connecting to a shovel implement, the proximal handle end preferably having a slot in which to store a removable flashlight. At a location along the shaft length is provided an outward projection for housing a light source, power supply and on/off switch. The projection extends outward from the shaft and directs light towards the shovel working end, while the backside of the projection includes a removable cover for replacement of batteries and light source elements. The projection is situated such that normal handling of the shovel is not impeded, while the directed light allows a user to visualize a given work area in a low light environment.

5 Claims, 5 Drawing Sheets

ILLUMINATED SHOVEL TOOL

CROSS REFERENCE TO RELATED APPLICATION

This application claims the benefit of U.S. Provisional Application No. 61/471,756 filed on Apr. 5, 2011, entitled "Shov Light."

BACKGROUND OF THE INVENTION

1. Field of the Invention

The present invention relates to hand tools with imbedded illumination means. More specifically, the present invention relates to a shovel tool having a hollow handle portion with a directed light source projection for illuminating a work area, and further a hollow handle proximal end for creating a housing for storing a detachable light source for general purposes in low light situations. The directed light source is one that is built into the shaft of the device or a location in which an handheld flashlight is secured and directed toward the shaft working end.

It is well known that working with handheld tools in low light environments can be both dangerous and lead to mistakes in the work being conducted. Generally a large light source will be utilized to illuminate an entire area, such as an outdoor work site or underground work environment. These light sources are generally large-scale work lights that are powered by generators or vehicles parked in proximity to the worksite. In certain environments, where work is being accomplished in smaller spaces, such devices may not adequately illuminate the given work space being operated on, such as a dig site wherein earth is being removed from a given location and an encompassing light source is projecting light from one location to provide visualization of the entire work location. In some cases, a more localized and directed light source may be necessary to inspect an area or to determine the state of a discrete location.

Handheld light sources and flashlights are convenient devices for locally inspecting and focusing light onto a given area. These devices are convenient for on-demand lighting, but can be cumbersome to handle if a plurality of hand tools or implements are being wielded simultaneously. It is relatively impossible for a worker to direct light onto a given location and concurrently utilize a shovel tool to inspect and excavate that same area, wherein the worker is handling both the light source and the shovel tool at one time. Such excavation tools require the use of both hands for proper operation, while the illumination of the target work area may only be possible between successive uses of the tool. To correct this flaw and to aid individuals working in tight quarters, low light environments, the present invention is disclosed for providing directed illumination onto a target area, wherein the light source is integrated into the handle of the hand tool, while further providing a removable light source for closer inspection independent of the hand tool.

The present invention is a shovel tool having a handle that provides directed light onto an area being excavated, such that the user is not required to remove his or her hands from the tool in order to visualize a target area in low light or tight quarters environments wherein a global lighting source may be inadequate. These environments include enclosed areas wherein shadows may prevent larger light sources from being efficient, outdoor work environments of expansive area and other similar situations wherein excavation is required with inadequate visualization of the area being disturbed. Such situations may place the worker at risk if subterranean power or gas lines are present, or harder material is discovered in which the hand tool is not adequately designed to handle. The light source of the present invention is one that is integrated into the handle of the tool and between common grasping areas for a shovel. Its positioning is such that normal operation of the shovel is not changed, and the light source housing is sheltered within a housing that projects from the handle shaft to direct light towards the shovel working end. Further provided is an internal cavity in the handle of the device that provides securement of an auxiliary light source, such that a flashlight or similar tool can be placed therein and easily removed for closer or more extensive inspection of an area without handling the rest of the shovel tool.

2. Description of the Prior Art

Devices have been disclosed in the prior art, including those that have been patented or described in published patent applications that pertain to combination hand tools and means of illumination. It is well known that combination tools exist to improve one's ability to visualize a work area and conduct a given task for which the tool is particularly suited. However, no shovel tool of similar structure and utility is disclosed that describes all elements of the present disclosure. While the devices in the prior art display familiar design elements for the purposes of providing a tool with internal light source, they fail to contemplate the elements of the present illuminated shovel device of the present invention. The devices deemed most relevant to the present disclosure are presented below.

Specifically, U.S. Published Patent Application Publication No. 2010/0164239 to Grennan discloses a lighted litter scoop having a hollow, elongated handle and shaft member, a spoon shaped working end and an LED lamp powered by an internal battery power source. The LED lamp is housed within the front end of the handle portion and above the elongated shaft member, providing downward illumination that is particularly useful for sifting through and removing clumps of waste within an enclosed kitty litter box. A user switch allows control of the LED light operation such that the work area within the litter box is illuminated, facilitating the ability of the user to visualize and remove waste therefrom. While describing an implement having a light source, the Grennan device does not disclose the present invention structural elements or its intended uses, which are related to construction or contractor equipment and illuminating a large work area.

U.S. Published Patent Application Publication No. 2006/0221598 to March is another such device that discloses a pick-up tool having an elongated hollow body, a first and second opposing pick-up fingers at the distal end of the hollow body and a lighting element coupled to the body. Linkages on extend from the pick-up fingers to the body, allowing the user to engage the two fingers together in order to compress and grasp an object of interest. A magnet and a reed switch are further deployed to engage the light for a predetermined period of time upon detection of the magnet within a given distance to the switch, which provides illumination when the fingers are engaging and when light is required. Similar to the Grennan disclosure, the March disclosure provides a lighted tool structure of diverging uses and intent as compared to the present invention, which is utilized in conjunction with a shovel and further provides a utility holder for an auxiliary flashlight.

Further, U.S. Published Patent Application Publication No. 2008/0016698 to Simpson discloses an illuminated washable spoon that includes a main spoon body having a concave distal end and a handle portion. The handle portion comprises a hollow structure having a depressible section and an imbedded illumination mechanism. The illumination mechanism comprises a power source, a pressure switch and a light source. The Simpson device is a washable child's spoon that includes an internal illumination means that is controlled by a depressible switch. The present invention provides a construction tool with a light projection means for direct illumination of a work area.

U.S. Published Patent Application Publication No. 2008/0030033 to Taylor further discloses a pick-up and disposal device having a pair of pivoting jaws joined together to a shaft. Similar to the March disclosure, the Taylor disclosure describes an articulating pick-up tool having opposable jaws. In addition to the mechanics of the Taylor pick-up tool structure, a clip is provided along the shaft of the device for attaching a light source, such as a flashlight. The Taylor device provides only a clip for a light accessory, as opposed to an integrated or internal light source built into the handle of the tool, which is provided in the handle of the present invention.

U.S. Published Patent Application Publication No. 2003/0094823 to Bradford discloses an illuminated implement apparatus having a handle portion and a working member support portion. The working member further comprises a pair of lamp accessories connected to its distal end, providing direct illumination of a working surface. A switch in the handle portion controls the lamp assemblies, while a battery pack within the handle provides a source of power. The working member support portion includes a pair of longitudinal support portions that form shovel blades or scoops, while the handle provides support along lateral sides of the pair of support portions. While providing a scoop having illuminating lamps, the structure of the present invention is more versatile and better adapted to provide an illuminating tool that does not change the tool's functionality. Specifically, the present invention provides a shovel device having a handle, wherein the handle employs a projection that houses an internal light source. The outwardly projected volume of the light is minimized and its location along the handle is such that is does not interfere with the basic use of the shovel, while the proximal end of the shovel handle further may include a cavity for storing an auxiliary light source therein.

Finally, U.S. Pat. No. 3,976,564 to Holder describes a sifting device for use in conjunction with a metal detector, wherein a shovel type scoop is provided with a flashlight built into the handle for illuminating the items gathered within the scoop. The scoop is further perforated to allow sifting, while the shape of the scoop places the flashlight bulb centrally along a connecting sidewall thereof for direct illumination of the articles within the scoop during sifting. The Holder device is well adapted for sifting through material and inspecting the material being sifted within its scoop, but provides little illumination of a work surface once the scoop is full of material. The present invention is more suited for illuminating a given work area, wherein the light projects outward from the handle, allowing a user to visualize the area being excavated, and further the area in which the displaced material is being relocated. The light is not inhibited by the content within the shovel itself, which is a critical drawback of the Holder device.

The present invention provides a new and novel shovel tool having direct illumination means and a holder for securing a removable, auxiliary light source in its handle region. The light source is one that is designed into a hollow region within the tool shaft or a handheld flashlight that is inserted therein, wherein outwardly projecting housing along the handle directs light onto a work surface of interest while excavating from that area. The light source is preferably a plurality of high intensity Light Emitting Diodes (LEDs) that draw electrical power from an internal battery pack or plurality of removable batteries, or alternatively is a removable flashlight that is secured into the housing interior for providing securement of an independent flashlight device. The structure of the present invention substantially diverges in design elements from the prior art and consequently it is clear that there is a need in the art for an improvement to existing lighted shovel tool devices. In this regard the instant invention substantially fulfills these needs.

SUMMARY OF THE INVENTION

In view of the foregoing disadvantages inherent in the known types of lighted shovel tool devices now present in the prior art, the present invention provides a new lighted hand tool wherein the same can be utilized for providing convenience for the user when illuminating a target work surface in low light environments without interrupting the function of the shovel tool operation while in use.

It is therefore an object of the present invention to provide a new and improved lighted shovel tool device that has all of the advantages of the prior art and none of the disadvantages.

It is another object of the present invention to provide a combination shovel tool and light source that provides high intensity and directed light from the shaft of the shovel to the shovel working end such that the excavation area can be inspected as the shovel is in operation, even in low light environments.

Another object of the present invention is to provide a combination shovel tool and light source that provides a mid-mounted, downwardly projecting light source housing that does not overly protrude from the handle and does not interfere with the operation of the shovel.

Yet another object of the present invention is to provide a combination shovel tool and imbedded light source with high intensity LED light sources and a replaceable power source.

Another object of the present invention is to provide a shovel tool having a housing to accept a removably inserted flashlight device in place of a permanent, imbedded light source along the shovel shaft.

Another object of the present invention is to provide a combination shovel tool and light source having a handle proximal end comprising an internal cavity that accommodates the securement of a removable, auxiliary light source for more detailed, shovel-independent inspections in low light and without requiring the user to carry the light source by hand.

A final object of the present invention is to provide a combination shovel tool and light source that is of rugged and durable construction such that its daily operation in harsh environments does not limit its utility or useful life.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
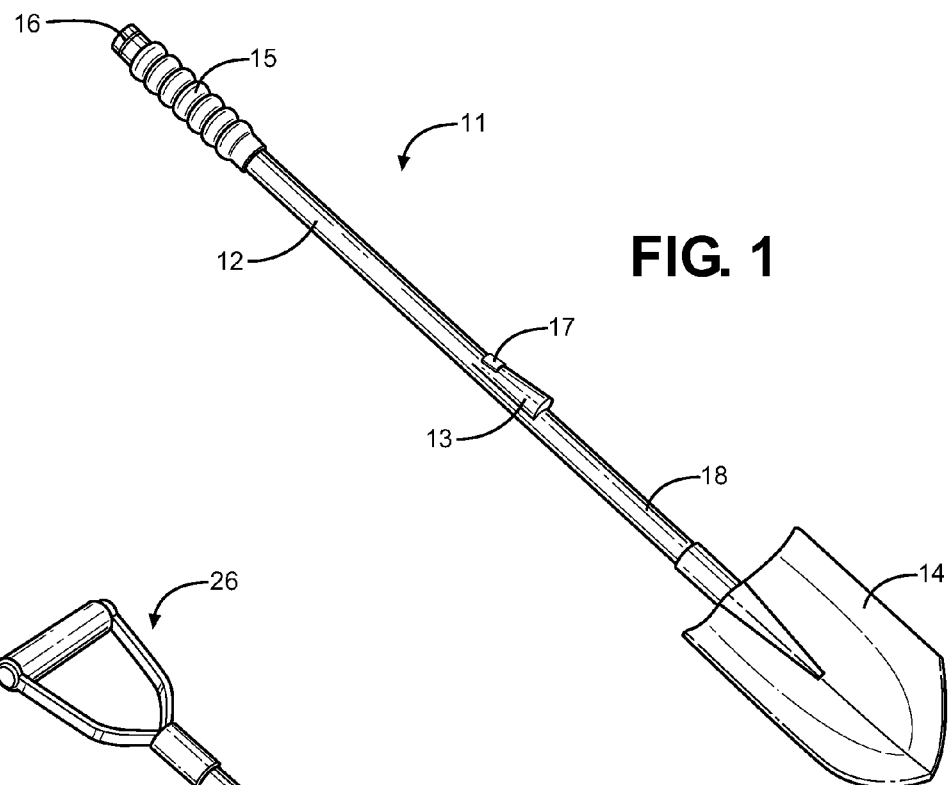
FIG. 1 shows a perspective view of the present lighted shovel tool device and auxiliary flashlight holder.

Reference is made herein to the attached drawings. Like reference numerals are used throughout the drawings to depict like or similar elements of the lighted shovel tool device. For the purposes of presenting a brief and clear description of the present invention, the preferred embodiment will be discussed as used for combining a directed illumination means with an excavation tool and further providing a cavity for securement of an auxiliary flashlight device. The figures are intended for representative purposes only and should not be considered to be limiting in any respect.

Figure 2:
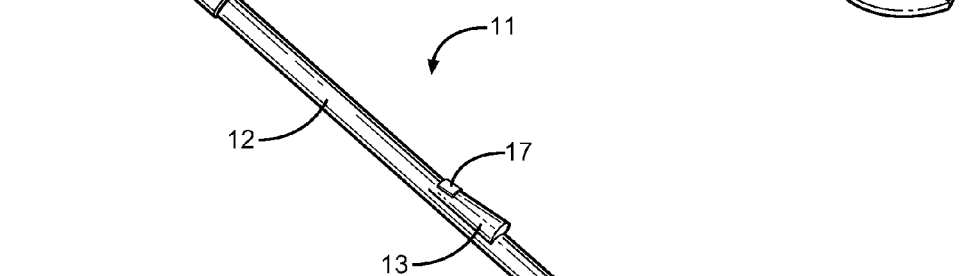
FIG. 2 shows a perspective view of another embodiment of the present lighted shovel tool device without the auxiliary flashlight holder.

Referring now to FIGS. 1 and 2, there are shown perspective views of embodiments of the lighted shovel tool of the present invention. The tool comprises an elongated shaft 11 having a distal working end 18, a proximal handle end 12 and a central projection 13 that serves as a raised housing for a directed light source to be projected therefrom. The housing 13 is situated along the central region of the shaft 11 between its two ends, such that grasping of the shaft 11 for shoveling operation is not hindered or altered with regard to a standard shoveling motion and grip. Attached to the distal working end 18 is preferably a shovel blade implement 14, while a user handle 15, 26 connects to the shaft proximal end 12 for allowing a user to grasp the tool with one hand and forcibly direct the blade 14 into a working surface. In the exemplary embodiment, the tool proximal end further comprises a handle 15 having a hollow internal shaft within which a cylindrical, auxiliary flashlight 16 may be fitted and therein secured. This allows a user to carry the flashlight 16 within the shaft 11 and eliminate the need to carry it or place it on the ground between uses. The auxiliary flashlight 16 is removable as necessary between shoveling operations to perform closer inspections of a work area without the use of the shovel tool, whereafter it can easily be replaced within the tool handle 15. In an alternate embodiment, the proximal end handle 26 is one of standard construction, providing a lateral grip or simple shaft termination grip for controlling the tool without the auxiliary light source cavity.

The light source within the raised housing 13 directs illumination towards the distal working end 18 of the tool, providing the ability to both operate the tool and visualize the target area without requiring the user to operate two independent devices: a handheld flashlight and the shovel. The light source is preferably battery powered and operated via a depressible, slideable or other suitable mechanical switch 17 that is provided in proximity to the housing and away from the normal hand positioning of the user when operating the shovel. The switch 17 engages the light source such that the user is provided a directed stream of high intensity light for visualization purposes.

Figure 3:
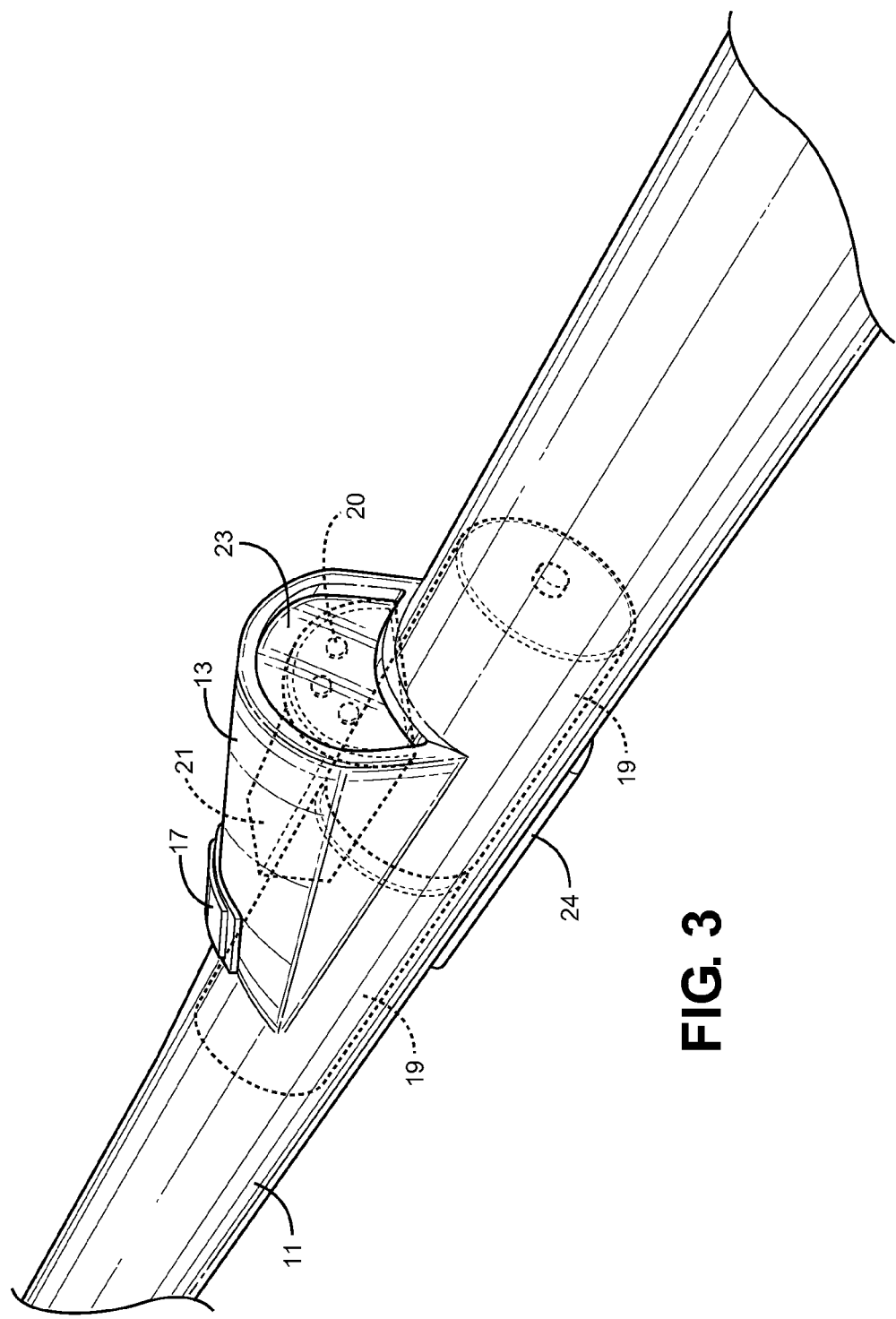
FIG. 3 shows a close-up perspective view of the light source housing of the present invention along the shaft of the shovel tool.

Referring now to FIG. 3, there is shown a close-up perspective view of the raised light source housing 13 and an embodiment of its internal elements. In an embodiment of the light source, high intensity LEDs 20 are provided and project illumination through an aperture 23 in the housing that is directed towards the tool shaft working end. The aperture 23 is covered by a lens screen that protects the internal components of the housing 13 and the LEDs themselves. The internal components comprise the electrical circuitry or module 21 to drive the LEDs, the reflector that directs light through the lens 23 and necessary electrical connections to the LED power source. The desired power source is one or a plurality of batteries 19, which are secured within the tool shaft 11 in proximity to the housing, which are further replaceable via an access panel 24 along the shaft. Finally, an electrical switch 17 is operable by the user to direct power from the batteries and the LEDs as desired for operation of the light source.

Figure 4:
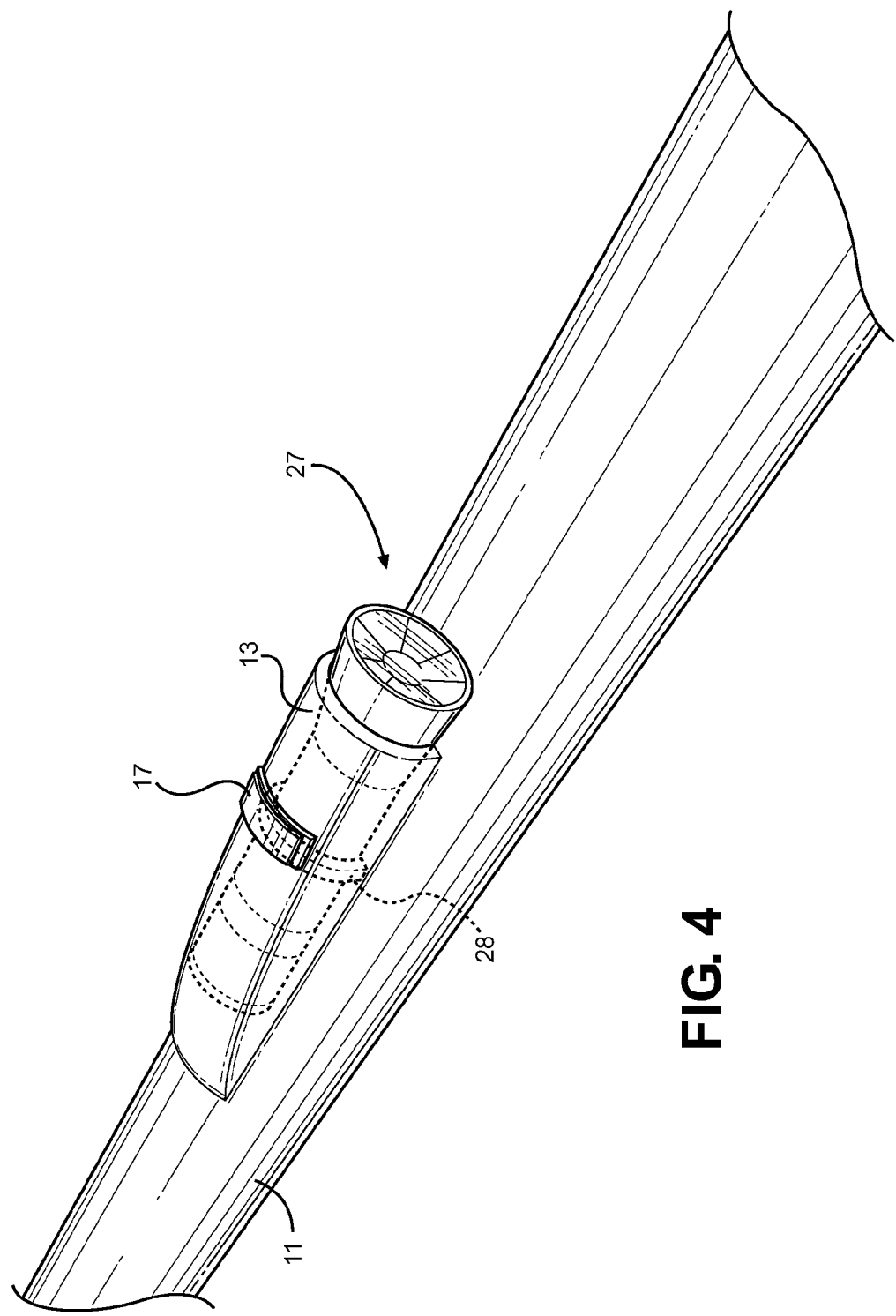
FIG. 4 shows a close-up perspective view of an alternate embodiment of the light source housing of the present invention, showing a removable light source secured within the shovel tool shaft housing.

Referring now to FIG. 4, there is shown a close-up perspective view of an alternate embodiment of the present invention shaft housing, wherein the housing 13 provides an open cavity in which to accept and secure a handheld flashlight device therein. The cavity provides no electrical connectivity or power, but rather a mechanical connection or securing means 28 to lock the body of the flashlight within the housing 13 while the shovel tool is in use. The mechanical connection or securing means 28 is one that clamps onto the body section or head section of the flashlight, in the way of a clevis fitting or a spring clip along the forward section of the housing to snap the flashlight into place and prevent it from sliding out. Any mechanical securing means suitable for securing either the body section or head section of the flashlight is contemplated. In this configuration, the shaft 11 and housing 13 of the device is much simpler, but requires the user to turn on the flashlight before insertion into the housing. No electrical components within the shaft or housing are required, rather a mechanical securing means is positioned therein to secure the structure of the flashlight while the shovel is being operated. In place of the electrical power switch, the switch is a mechanical connection that controls a release for the flashlight securing means.

Figure 5:
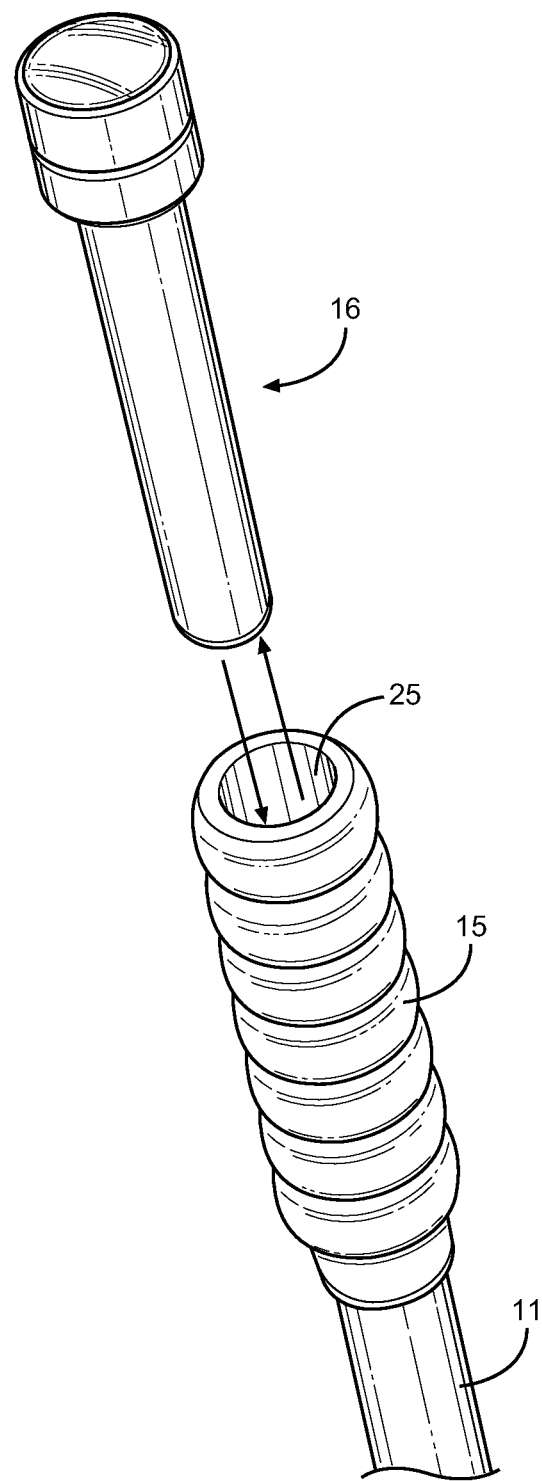
FIG. 5 shows a perspective view of the auxiliary flashlight holder handle of the present invention.

Referring now to FIG. 5, there is shown a perspective view of the exemplary embodiment of the present invention proximal end, highlighting the open cavity handle 15 that is utilized to secure an auxiliary flashlight device 16. In this embodiment, the handle 15 comprises a hollow interior volume 25, which accommodates a cylindrical flashlight 16 that is fitted therein and secured while the tool is in operation. This allows an auxiliary light 16 to be carried within the tool shaft 11 and eliminates the need for the user to carry such a light by hand or otherwise store it between uses. The handle 15 itself may provide a cushioned or high grip surface that facilitates improved grasping and control over the tool, while the cavity 25 is sized to secure the flashlight 16 in a static position while the tool is being wielded.

Figure 6:
FIG. 6 shows a perspective view of the present invention in a working position, targeting directed illumination at a work area being excavated by a user.

Referring now to FIG. 6, there is shown a view of an embodiment of the present illuminated shovel tool in a working state, wherein a user is directing light from the light source onto a work surface 22 in which the tool working end 14 is being utilized for excavation purposes. Light from the housing 13 is directed along the shaft of the tool and towards its working end to provide ready visualization of an area of interest that is to be excavated. This may be primary importance if an area may contain hazardous items, such as utility lines, or delicate items that one would otherwise not contact with the shovel during excavation. The light is ideal in situations where a larger, more global lighting source is not present or appropriate. These include secluded work environments, underground areas and tight-quarter spaces in which a larger, independent light source may not be useful because of shadowing created by the workers or the environment.

In use, the present invention is well suited for gardeners, construction workers, and other individual users excavating an area in low light environments wherein one is required to see clearly the works area around them. While external flashlights or overhead lights are useful in most situations, there is a clear need for those situations wherein these types of lights are not adequate for providing lighting and vision of a work area, particularly in secluded areas at night or in enclosed, tight-quarter situations such as mining or tunnel areas. These overhead lights are not suited for provided sufficiently concentrated illumination in specific portions of work areas, which would otherwise necessitate the use of a handheld flashlight device while working. Since this is both inconvenient and difficult to accomplish, the present invention is submitted as an alternative solution. Proper illumination is required to prevent possible accidents that may lead to workers becoming injured or further prevent a worker from properly completing a given project.

The structure of the present tool may take any form one skilled in the art of shovel tools may contemplate, including heavier wooden shafts to lighter, more modern materials such as fiberglass and rigid thermoplastics. The shaft itself may either be completely hollow, or be of solid construction and provide cut-outs for the illumination housing and power therefor, and further for the auxiliary flashlight within the shaft handle. The working end of the tool may also be of varying design and use, wherein any digging, excavation or construction tool is contemplated in conjunction with the disclosed tool shaft. An exemplary embodiment contemplates a shovel blade for removing and displacing volumes of earth. However, it is not desired to limit either the structure or material of the shaft, nor is it desired to limit the type of working end implement utilized in conjunction with the elongated and illuminated shaft. It is rather desired to disclose a tool shaft that incorporates an internal light source for providing illumination directed towards its working end, while also including an internal cavity for securing a removable, auxiliary flashlight within its proximal handle.

In light of the present disclosure and the given prior art, it is submitted that the instant invention sufficiently differentiated from known devices and has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighted shovel tool, comprising:
    an elongated shaft having a length, proximal handle end, a distal working end and a light source housing between said ends;
    said light source housing comprising a raised projection from said shaft for directing said light source towards said distal working end;
    said distal working end further comprising a shovel blade;
    said light source housing further comprising an electrical lighting source, an aperture covered by a transparent lens for directing light to said distal working end, a light reflector and a power switch for controlling said light source operation;
    said proximal handle end having an interior cavity running lengthwise within said shaft;
    an auxiliary flashlight removably securable within said interior cavity;
    one or a plurality of battery power sources within said shaft for providing power to said light source.

2. The device of claim 1, wherein said battery power sources are removable via an access panel along said shaft.

3. The device of claim 1, wherein said light source is one or a plurality of high intensity LEDs.

4. A lighted shovel tool, comprising:
    an elongated shaft having a length, proximal handle end, a distal working end and a light source housing between said ends;
    said light source housing comprising a raised projection from said shaft for directing said light source towards said distal working end;
    said proximal handle end having an interior cavity running lengthwise within said shaft;
    an auxiliary flashlight removably securable within said interior cavity;
    said distal working end further comprising an excavation tool implement;
    said light source housing further comprising an open cavity for securing a handheld flashlight body and securing means, wherein said securing means comprises a clevis fitting about said flashlight body section.

5. The device of claim 4, wherein said excavation tool implement comprises a shovel blade.

* * * * *